Figure 1:
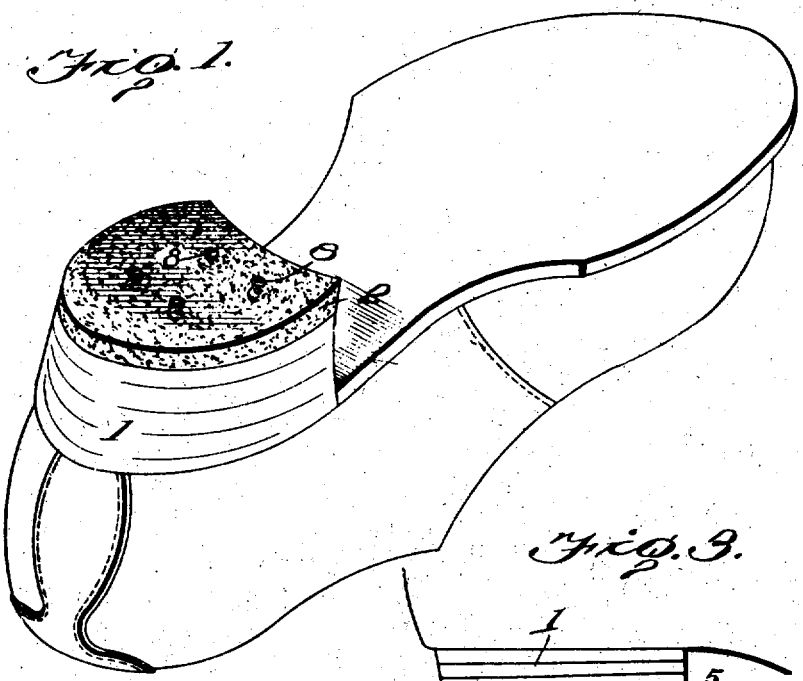

J. G. TUFFORD.

RESILIENT HEEL.

APPLICATION FILED JUNE 22, 1915.

Reissued Jan. 11, 1916. 14,049.

Inventor

J. G. Tufford.

By

H. A. Hartsing.

Attorneys

UNITED STATES PATENT OFFICE.

JOHN G. TUFFORD, OF ELYRIA, OHIO, ASSIGNOR, BY DIRECT AND MESNE ASSIGNMENTS, TO THE I. T. S. RUBBER COMPANY, OF ELYRIA, OHIO.

RESILIENT HEEL.

14,049. Specification of Reissued Letters Patent. Reissued Jan. 11, 1916.

Original No. 1,110,730, dated September 15, 1914, Serial No. 760,290. Application for reissue filed June 22, 1915. Serial No. 35,710.

*To all whom it may concern:*

Be it known that I, JOHN G. TUFFORD, a citizen of the United States of America, residing at Elyria, in the county of Lorain and State of Ohio, have invented certain new and useful Improvements in Resilient Heels, of which the following is a specification.

This invention relates to shoe heels, and more particularly to an improvement in cushion heels of that type comprising an elastic lift adapted to be applied to the ordinary heel.

The ordinary form of elastic lift now in common use is flat upon both its upper and under faces so that its flat upper face will bear flat against the flat under face of the lowermost leather lift of the heel to which the cushion heel is applied. As a consequence, after the elastic or cushion lift has been applied and the shoe has been worn for a short time, the pressure to which the cushion lift is subjected will result in its edge portions being projected or spread to a greater or less degree beyond the sides of the shoe heel proper, presenting an unsightly appearance and providing a crack or space into which dirt may enter, rendering the heel uneven and weakening its connection with the shoe heel proper.

I am aware that it has been proposed to employ a cushion lift having a concave upper face to be applied to the under face of the shoe heel proper, but I do not believe that up to the present time any practical and satisfactory means has been discovered and employed for attaching such a lift so that its connection with the shoe heel will be to any extent permanent. The method usually employed in securing such cushion lifts in place is to embed in the lift a plate conforming in contour to the concavity of the lift and then secure the lift in place by driving nails or screws through the plate and into the heel of the shoe, and where this method is not followed circular washers are embedded in the lift and have nails or other securing elements driven through them and into the shoe heel. In the first instance, the pressure imposed upon the heel will tend to flatten out the plate thereby causing its edges to cut through the lift besides weakening or loosening the securing elements, and, in the second instance, so far as I am aware, the washers have been circular and are arranged so as to be exposed at the tread surface of the lift after the shoe has been worn for a short time.

It is, therefore, one aim of the present invention to provide a cushion lift so constructed that, when applied to a shoe heel, its edge portions will not be forced to project beyond the sides of the heel, when pressure is applied, and to so arrange the attaching means for the lift that the lift may wear to a maximum extent without exposing such fastening means.

Another aim of the invention is to so arrange the attaching devices that they will be located relatively remote from the edge of the heel lift, whereby the lift may wear to a maximum extent without exposing the same, and incidentally the invention contemplates so constructing the washers which constitute an element of the securing means as to further prolong the life of the lift.

The invention has as another object to so form the concave upper side of the cushion lift that, when the lift is subjected to pressure, any tendency for the edge portions of the lift to crowd beyond the sides of the shoe heel will be counteracted and there will be equally as great a tendency for the material of the lift to crowd or compress toward the center thereof.

The result last-mentioned is accomplished in part by forming the concave side of the lift with a number of separate and distinct concave areas which, in fact, constitute a plurality of suction cups coöperating with the under side of the shoe heel when pressure is applied, and inasmuch as these concave areas are separated from each other, the expansion or spreading of the portion of the lift of which they constitute the surfaces will be accommodated so as to secure the result aimed at.

The invention aims further to construct the lift and the attaching means therefor in such a manner as not to destroy or impair the suction action resulting from the use of a lift having a concave upper surface.

Figure 3:
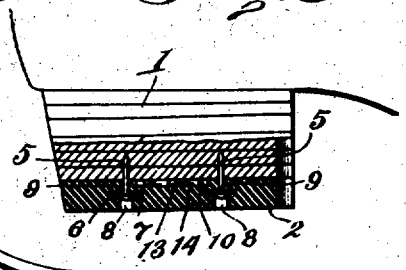
Figure 2:
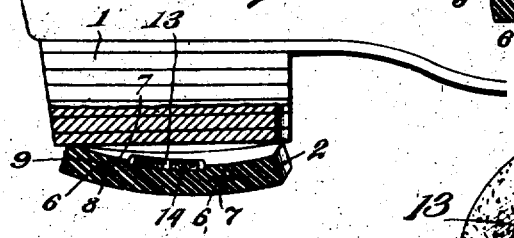
Figure 4:
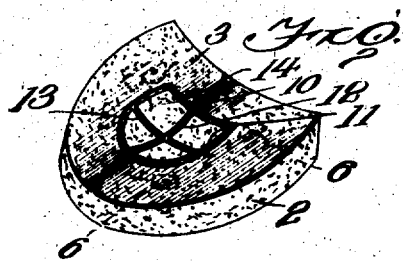
Figure 5:
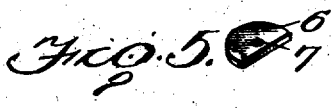

In the accompanying drawings:—Figure 1 is a perspective view of the lift embodying the present invention applied to a shoe heel; Fig. 2 is a front to rear sectional view through the lift in position disposed against the under side of a shoe heel and immediately prior to application thereto; Fig. 3 is a similar view through the heel, illustrating the same applied; Fig. 4 is a perspective view looking at the upper side of the lift removed; and Fig. 5 is a perspective view of one of the washers comprising an element of the attaching means for the lift.

In the drawings, the numeral 1 indicates the heel of a shoe and 2 the cushion lift embodying the present invention. The lift 2 is, as usual, formed from rubber, and is molded or cut so as to be of concavo-convex form on any line of cross section. In marginal outline, the lift is of substantially the same outline as the side of the shoe heel 1 and is, of course, to be finished to the same dimensions as the usual shoe heel, either before or after its application thereto. The concave upper side of the lift 2 is indicated by the numeral 3, and the convex under side by the numeral 4. It is preferable that the lift be of the same thickness throughout and that its marginal surface be at all points radial to the center of curvature of its concave side 3 so that, when the lift is applied to the shoe heel and subjected to pressure, its said marginal surface will be coincident with the side of the shoe heel.

As a means for securing the lift in place upon the under side of the shoe heel, small nails or other suitable securing elements 5 are employed and are driven through washers 6, which are embedded in the lift, and into the shoe heel. These washers 6 are of the form shown in Fig. 5 of the drawings, and each is of segmental form, the chordal edge of each washer being so positioned that the arcuate edge thereof will describe approximately three-fourths of a circle. Each washer is provided with an opening 7 to accommodate the nails or other securing elements 5, and the said opening in each washer is located concentric to the arcuate edge thereof. By reference to Figs. 1 and 4 of the drawings, it will be observed that the washers are so embedded and arranged within the body of the lift that their chordal edges will be presented toward the adjacent portion of the edge of the said body, so that, broadly speaking, that edge portion of each washer which is nearest the edge of the body of the lift will be spaced from said edge a greater distance than if the washers were of practically circular form. At this point it may be remarked that by so forming the washers and by arranging them in the manner stated and shown, a maximum wear of the edge portions of the lift is provided for before the washers can be exposed. It will further be observed by reference to the figures of the drawings that the washers are spaced substantially equidistant from the margin of the lift and that they are located as near the center of the lift as is practical considering a peculiar construction of the lift which will presently be described. The body of the lift 2 is formed in alinement with the opening 7 in each of the washers 6 with openings 8 and 9 which are extremely small in diameter and terminate respectively at the convex and concave sides of the lift. In fact, these openings are so minute that, when the nails 5 are driven through the lift, the walls of the openings will be crowded and, consequently, will snugly embrace and fit the surface of the nails. It has before been stated that a suction force is exerted due to the concave upper side of the lift, and it will now be apparent that due to the snug fit of the nails in the openings 8 and 9 the partial vacuum established when pressure is exerted upon the heel will not be destroyed or impaired. The openings 8 and 9 merely form guides for the nails 5 and are so small that they will not permit any appreciable escape of air from the suction area of the lift when the convex face thereof is flattened to temporarily hold said lift in position on a heel prior to permanently securing the lift with the nails.

By references to Figs. 2 and 4 of the drawings, it will be seen that the concave upper face of the lift lies entirely below a plane passing through the rear upper edge and breast corners of the lift whereby to cause the entire margin of said lift to exert a uniform pressure on the heel of a shoe when the lift is positioned on the heel and the convex face thereof depressed to flatten said lift. In other words, owing to the curvature of the concave attaching face of the lift, the rear upper edge and breast corners of said concave attaching face are disposed in a plane above the upper side edges and the breast edges of the lift.

As before pointed out, the concave side of the lift is provided with a number of concave or suction areas and in forming these areas channels 10 and 11 are molded or cut in the concave face of the lift and preferably extend respectively concentric to the forward and curved edges of the lift, as clearly shown in Fig. 4 of the drawings. These channels are relatively narrow and relatively shallow, and in addition thereto there are channels 12 and 13 which extend respectively from front to rear and transversely of the concave surface of the lift. In this manner, the central portion of said surface is divided into four suction or concave areas in addition to the main area which may be considered as surrounding the group of first-mentioned areas which, in the drawings, are indicated at 14, and it will be apparent that, if desired, the channels may have different lines of extent than here shown, whereby to increase or decrease the number of suction areas 14 or to vary the arrangement thereof.

It will now be seen that, when the lift is subjected to pressure, each of the several suction areas 14 will be flattened and a partial vacuum created at each point of their location as well as throughout the entire surface of the upper side of the lift. The formation of the group of suction areas, however, presents this advantage, namely, that the channels resulting in their formation accommodate the marginal portions of the material of the lift of which the areas constitute the surfaces when these portions are spread due to the pressure exerted and, therefore, the lift is not compressed or spread bodily from its central portion toward its margin, but the expansion due to compression is equalized throughout the body of the lift.

Having thus described the invention, what I claim as new is:—

1. A cushion heel lift having washers embedded therein near its center portion and each of segmental form, the washers being arranged with their chordal edges presented toward the edge of the lift.

2. A cushion heel lift divided by a plurality of inter-communicating channels into a group of suction areas.

3. A cushion heel lift having a concave attaching face formed with a groove having a line of extent substantially parallel to the margin of the lift and having other channels intersecting each other and communicating with the first-mentioned channel.

4. A cushion heel lift having its attaching face provided with a suction area located substantially centrally thereof, and washers embedded in the lift and located in a series extending around the said area and located relatively close thereto, the washers at their sides which are located nearer the margin of the lift being straight edged.

5. A heel lift of substantially non-metallic resilient material having its body portion of concavo-convex form on every line of cross section, the concave upper face lying entirely below a plane passing through the rear upper edge and the breast corners of the lift.

6. A heel lift of substantially resilient material having its body portion of concavo-convex form on every line of cross section, the concave upper face lying entirely below a plane passing through the rear upper edge and the breast corners of the lift, said lift being provided with nail receiving openings located near the center thereof.

7. A heel lift of substantially resilient material comprising a body portion, the attaching face of which is concave and the tread face of which is convex on every line of cross section and normally held in such form by its own inherent resiliency, the concave attaching face lying entirely below a plane passing through the rear upper edge and the breast corners of the lift, whereby to cause the entire margin of said lift to exert a uniform pressure on the heel of a shoe when said lift is positioned on the heel and the convex tread face thereof depressed to flatten said lift.

8. A heel lift of resilient material comprising a body portion of uniform thickness throughout its entire area and of concavo-convex form on every line of cross section, the concave upper face of the lift lying entirely below a plane passing through the upper edge and the breast corners of said lift.

9. A heel lift of resilient material comprising a body portion, the attaching face of which is concave and the tread face of which is convex, the concave face of the lift being unbroken and lying entirely below a plane passing through the rear upper edge and the breast corners of the lift, whereby when the convex tread face is depressed to flatten said lift a suction will be created between the lift and the heel to hold the attaching face of the lift throughout its entire extent in contact with the exposed face of the heel.

10. A heel lift of substantially resilient material comprising a body portion, the attaching face of which is concave and the tread face convex on every line of cross section, the rear upper edge and breast corners of the concave attaching face of the lift being disposed in a plane above the upper side and breast edges of said concave attaching face.

In testimony whereof, I affix my signature.

JOHN G. TUFFORD. [L. S.]